E. P. SHELDON.
DELIVERY MECHANISM FOR FOLDED PRODUCTS.
APPLICATION FILED FEB. 2, 1910.
1,118,513. Patented Nov. 24, 1914.
8 SHEETS—SHEET 1.
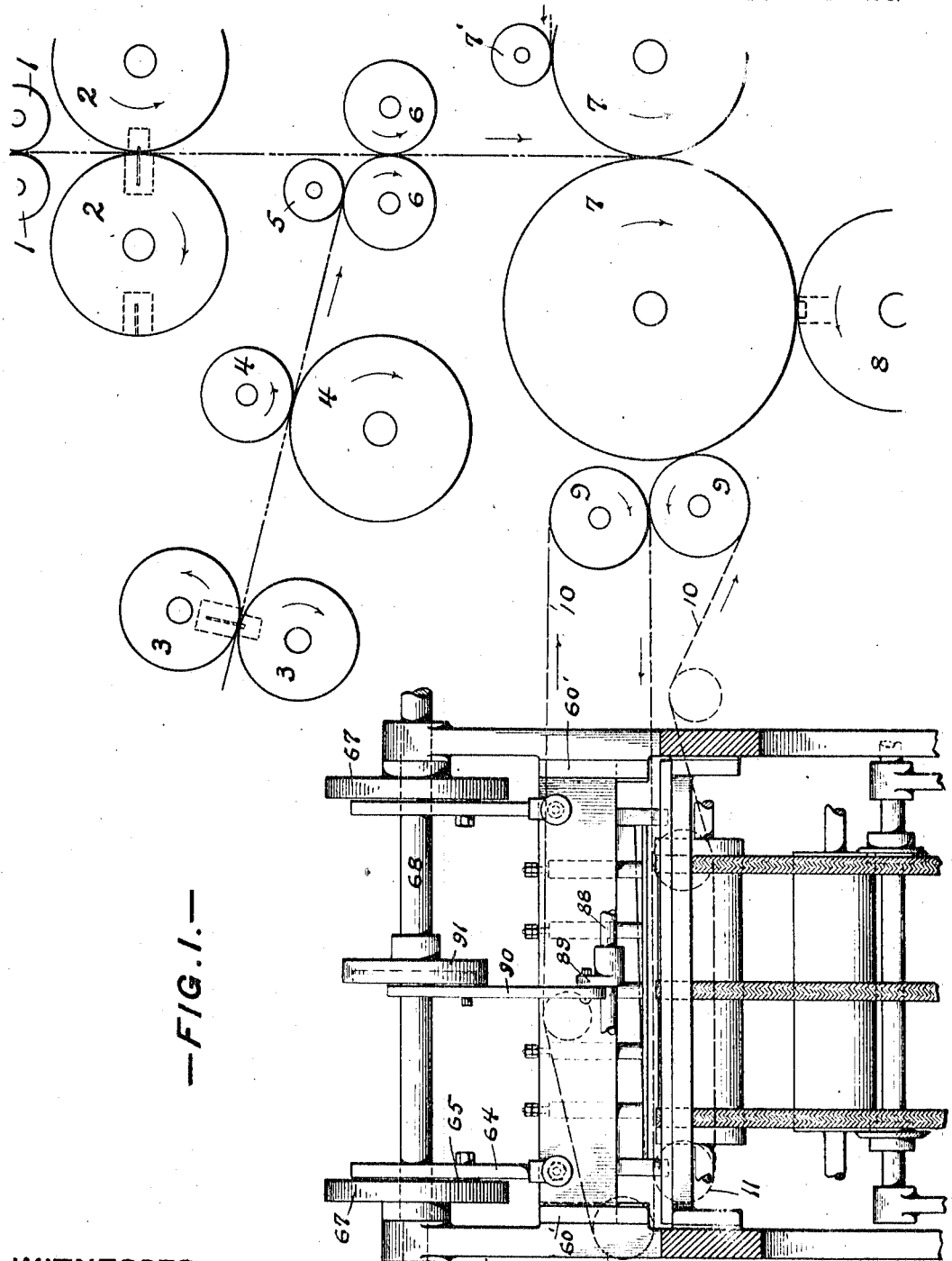

E. P. SHELDON.
DELIVERY MECHANISM FOR FOLDED PRODUCTS.
APPLICATION FILED FEB. 2, 1910.
1,118,513.
Patented Nov. 24, 1914.
3 SHEETS—SHEET 2.
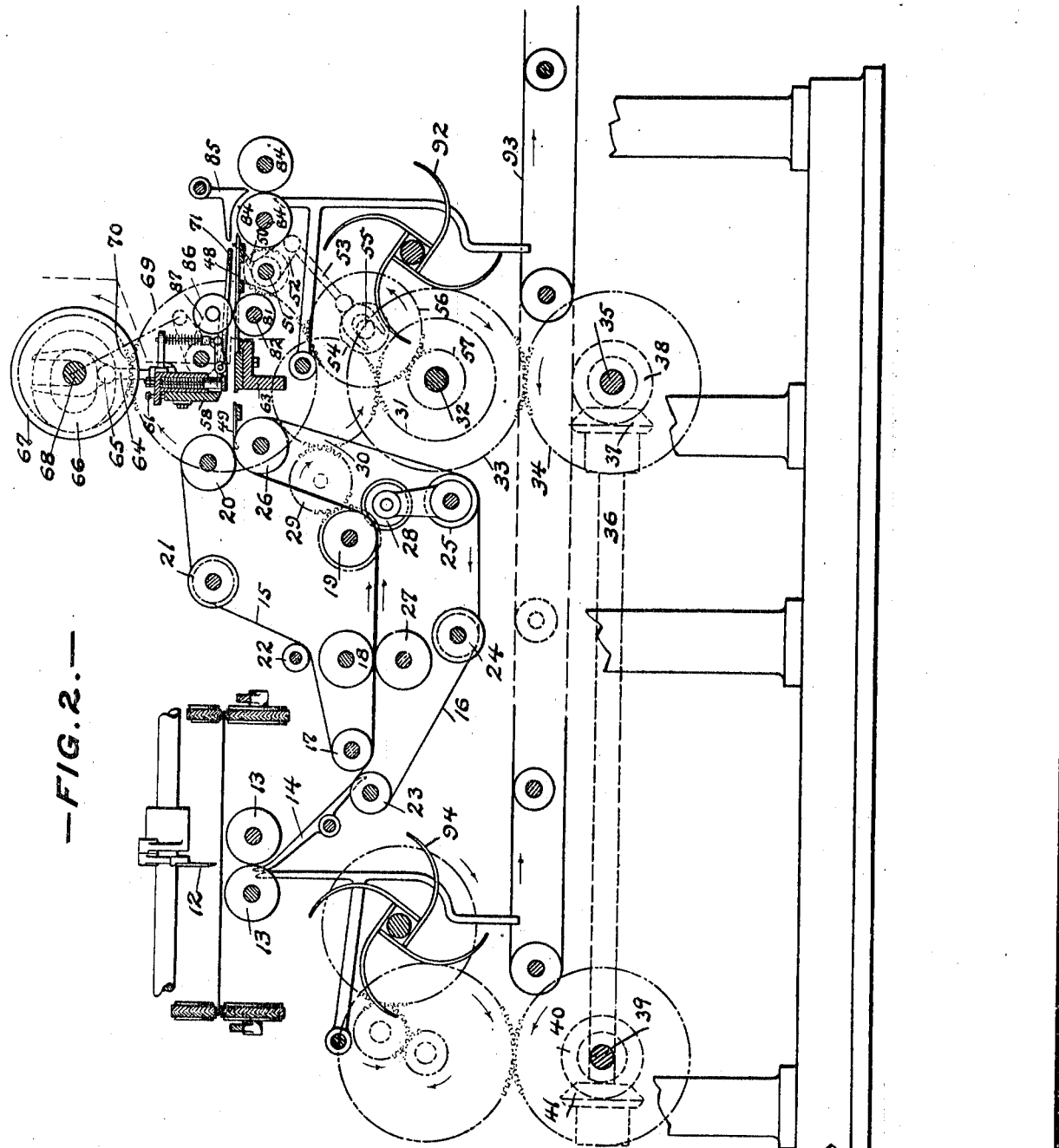
WITNESSES.
A. White
John J. Kearns
INVENTOR.
Edward P. Sheldon
Phelps, Sawyer, Rice & Kennedy
Att'ys.

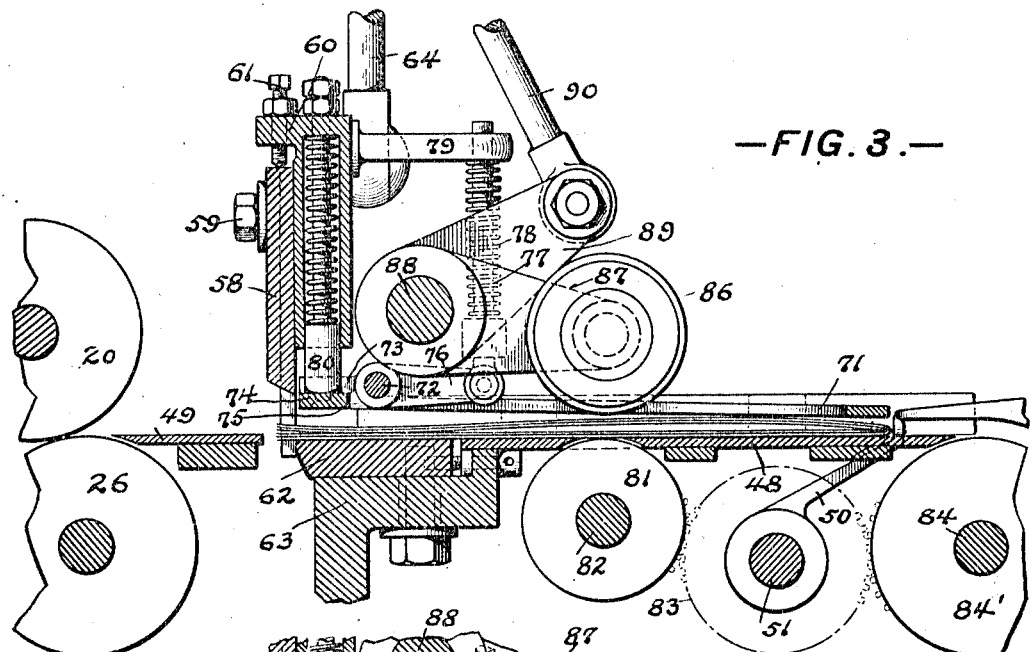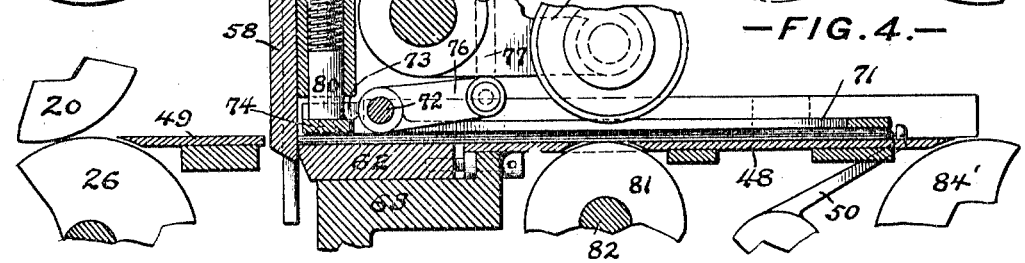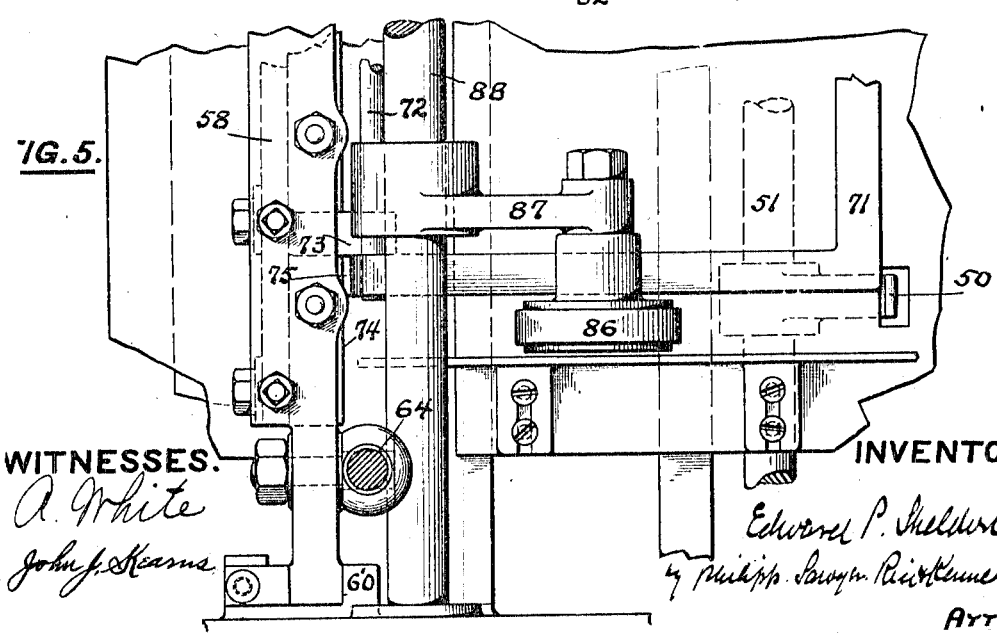

UNITED STATES PATENT OFFICE.

EDWARD P. SHELDON, OF NEW YORK, N. Y., ASSIGNOR TO R. HOE AND CO., OF NEW YORK, N. Y., A CORPORATION OF NEW YORK.

DELIVERY MECHANISM FOR FOLDED PRODUCTS.

1,118,513.        Specification of Letters Patent.        Patented Nov. 24, 1914.

Application filed February 2, 1910. Serial No. 541,447.

*To all whom it may concern:*

Be it known that I, EDWARD P. SHELDON, a citizen of the United States, residing at New York, county of Kings, and State of New York, have invented certain new and useful Improvements in Delivery Mechanism for Folded Products, fully described and represented in the following specification and the accompanying drawings, forming a part of the same.

This invention relates to improvements in machines for producing a folded product.

In producing folded products, such, for instance, as weekly papers, or magazines comprising a large number of plies constituting what may be termed a single signature, it is customary either to apply the cover and the inset advertising sheets, when they are used, in the printing machine by agencies connected directly with the printing machine, in which case the product is usually secured together by stapling or otherwise by agencies forming a part of the printing machine, or the main part of the product is produced in the printing machine and the inset sheet and cover or both are applied after the product is taken from the printing machine, in which case the securing of the plies together is effected outside of the printing machine. Further, in the production of the products referred to, it is customary, after the product is completed, to trim the ends and sides of the product, this being accomplished by an independent trimming machine.

It is one of the objects of this invention to produce an improved machine for producing a folded product provided with a delivery mechanism which includes devices by which the product may be trimmed, and a second delivery mechanism which receives the product in an untrimmed condition, the mechanism including means by which either delivery mechanism may be utilized, A further object of the invention is to produce an improved trimming mechanism which may be employed in connection with machines for producing a folded product, said mechanism embodying devices by which the edge of the product opposite the fold line may be trimmed.

A further object of the invention is to produce a trimming mechanism which may be employed in connection with a machine for producing a folded product, said mechanism including devices for trimming the ends of the product and the edge of the product opposite the fold line, there being also employed means for presenting the product successively to said trimming devices.

With these and other objects not specifically referred to in view, the invention consists in certain constructions and in certain parts, improvements and combinations as will be hereinafter fully described and then specifically pointed out.

Referring to the drawings—Figure 1 is an end view, partly in section, of one form of mechanism embodying the invention, this mechanism being shown in connection with the product assembling mechanism of a fast rotary printing machine. Fig. 2 is an end elevation, partly in section, of the construction shown in Fig. 1, the product assembling mechanism of the printing machine being omitted from this view. Fig. 3 is a detail sectional view illustrating more particularly the edge trimming devices and the parts immediately connected therewith. Fig. 4 is a view similar to Fig. 3 but showing some of the parts in a different position. Fig. 5 is a plan view of the construction illustrated in Fig. 3.

Constructions embodying the invention are particularly adapted for use with the product assembling devices of fast rotary printing machines, although as to all its features the invention is not restricted to such use.

In the particular construction illustrated, 1 indicate the drawing-off rolls ordinarily employed in a printing machine for assembling a number of printed webs. From these drawing off rolls, the webs, in the construction illustrated, pass between the usual cutting cylinders 2 by which the webs are divided into sheets.

The particular machine in connection with which the invention is illustrated, is intended to insert what is called an inset sheet. Provision is made for the addition to the sheets taken from the cutters 2, of a sheet or sheets formed by cutters 3, this sheet passing between advancing rolls 4 and beneath a roll 5, this product being assembled with the product from the rolls 2 by rolls 6.

The particular machine illustrated is also provided with cover supplying means, the cover being assembled with the product passing between the rolls 6 by means of rolls 7 and a roll 7'.

The particular machine illustrated is also provided with means for securing together the various plies which form the product. As shown, the plies are secured together by staples which are inserted by a stapling roll 8 coöperating with one of the rolls 7 before referred to.

As illustrated, the product after leaving the rolls 7, 8 passes in a flat form between the rolls 9, and is forwarded by tapes 10 passing around the rolls 9 and 11 beneath a transverse folding knife, as indicated at 12.

It will be understood that the devices so far described are of usual form, and that other devices may be substituted for some or all of them, if desired, those illustrated being selected merely to illustrate a form of mechanism for producing a folded product.

When the invention is carried into effect in connection with a mechanism for producing a folded product, the product may be forwarded from the folding mechanism to a delivery mechanism including trimming devices. In the particular machine shown, the transverse folding knife before referred to passes the product into the nip of a pair of folding rolls 15 which rolls deliver the product to a guide 14 which in turn directs the product to a set of forwarding tapes 15, 16. The tapes 15 pass around supporting rolls or pulleys 17, 18, 19, 20, 21 and 22, and the tapes 16 pass around rolls or pulleys 23, 24, 25, 26, the pulley 19 before referred to and a roll 27. These tapes constitute a well-known type of forwarding device for the product, but it is to be understood that any other suitable form of forwarding device may be used instead of them.

In the particular machine shown, the forwarding devices conduct the product past suitable trimming mechanism which operates to trim the ends of the product. While this trimming mechanism may be varied in character, as shown, it consists of rotary slitting knives 28 which coöperate with the roll 19 before referred to. This roll 19 may be a driven roll, and in the construction illustrated is shown as driven by an intermediate 29 from a gear 30, this gear being in mesh with a gear 31 on a shaft 32. This shaft 32 when employed may be driven in any suitable manner. As illustrated, it is provided with a gear 33 in mesh with a gear 34 on a shaft 35, this shaft being driven from a way shaft 36 by means of the usual bevel gears 37, 38. The shaft 36 may be driven from a shaft 39 which may constitute the power shaft of the mechanism, by means of intermeshing gears 40, 41.

When the invention is embodied in a machine which includes end trimming devices, the product may, after it has been acted upon by these devices, be subjected to the action of mechanism by which the trimming of the edge of the product opposite the folded edge is effected.

The edge trimming mechanism employed may be varied widely. As illustrated, the product, after passing between the tapes and the rolls 20, 26, is delivered upon a table 48, a guide 49 being, in the machine illustrated, shown as operating in connection with the rolls to insure the proper delivery of the product upon the table. In machines embodying the invention in its best form a registering device will be employed to properly position the product with respect to the edge trimming devices. Where, as in the machine illustrated, the trimming devices include a support or table upon which the product is brought to a stop before trimming, the registering device may include a series of swinging stops 50, these stops being mounted on a rock shaft 51 which may be operated through a rock arm 52 and a rod 53, this rod being actuated by a cam 54 on a stud 55, the cam being driven from a gear 56 in mesh with a gear 57 on the shaft 32. It will be understood, of course, that by the mechanism referred to the stops will be interposed in the path of the product at the proper time to stop it, so that the edge to be trimmed will be properly presented to the trimming devices.

The trimming devices, in the particular machine illustrated, include a knife 58 secured by a screw 59, or in any other suitable manner, to a cross-head 60 arranged to move in ways 60', the knife being, if desired, adjusted by a set screw 61, or in any other suitable manner. As shown, the knife coöperates with a cutter block 62 mounted on a cross bar 63, this bar also serving to support the table 48 before referred to. When a cutter of the character referred to is employed, the cutter head which carries it may be operated in any suitable manner. In the particular construction illustrated, the cutter head is operated by means of rods 64, these rods carrying studs 65 which work in cam grooves 66 in cam disks 67, these disks being mounted on a shaft 68. This shaft 68 may be driven in any suitable manner, as by an intermediate 69 and a gear 70 from the gear 56 before referred to.

The plies of freshly folded products do not, as a rule, lie flat and there is often considerable air between the plies, so that should the product be trimmed at the edge opposite the fold line without flattening down the plies and expelling the air, the edges of the plies would be liable to be uneven when the product is subsequently flattened out and the air expelled. Machines embodying the invention in its best form therefore, will include means for compressing the plies and expelling the air prior to the trimming operation.

While these means may be varied, in the particular construction illustrated there is provided a frame 71 forming three sides of a rectangle, this frame being of a size to press upon the margins of the folded product so as to flatten it and expel the air without pressing upon the printed part of the product, thus avoiding offset. The air expelling frame, in the particular machine illustrated, is pivotally supported on a rock shaft 72 in turn supported in brackets 73. In the construction illustrated, these brackets are mounted on a bar 74 which will be hereinafter referred to. In the best construction, this air expelling frame, when a frame is employed for this purpose, will stand so that that edge which operates upon the fold of the product will come into operation first. In the machine shown, this is effected by mounting the frame so that that part of it which operates on the product near the fold line is nearer the table 48 than the remainder of the frame. To maintain the frame in proper position, it may be provided with heels 75 which butt against the bar 74. To maintain the frame firmly and yet yieldingly in position, so that it may exercise a proper pressure upon the folded product, the shaft 72 on which the frame is mounted is, in the machine illustrated, provided with an arm 76 to which is connected a spring rod 77 surrounded by a push spring 78 which bears against a bracket 79 fast on the cutter head, which bracket the rod 77 plays. In the operation of the device, as the cutter head descends, the toe or end of the frame farthest from the cutter head strikes the fold of the product first. As the head continues to descend, the frame comes into operation along its sides, thus flattening the product and expelling the air therefrom.

In the best constructions embodying the invention a clamp will be employed for the purpose of firmly holding the edge to be trimmed during the trimming operation. While this clamp may be constructed in various ways, as shown the bar 74 before referred to is utilized for this purpose, this bar being carried by spring plungers 80 socketed in the cutter head, this construction being a usual one. After the frame has flattened out the product and expelled the air, the bar 74 clamps the edge of the product after which the knife comes into operation and trims the edge.

When the edge trimming means employed is of such a character that the product is stopped in order to effect the trimming, means may be provided for again forwarding the product after trimming. While the means employed may be varied in character, as shown, there is provided a series of forwarding rolls 81 mounted on a shaft 82, this shaft being preferably continuously driven in any suitable manner, as, for instance, by a gear 83 loosely mounted on the shaft 51 before referred to, this gear being in turn driven from suitable gearing on shafts 84 which carry, in the machine illustrated, directing rolls 84'. A guide 85 may be employed in connection with these directing rolls. There is employed, in the machine shown, in connection with the rolls 81, drop rolls 86, one of these drop rolls and its carrying arm being shown in Figs. 3 and 5 of the drawing, these rolls being mounted in arms 87 extending from a rock shaft 88, this shaft being provided with an operating arm 89 to which is secured a rod 90, this rod being driven from a cam 91 on the shaft 68 before referred to. The product having been trimmed and set in motion may be delivered in any suitable manner. In the construction shown, the rolls 84 deliver to the usual S-fly 92 which in turn drops it on a conveyer 93 of the usual type.

It may be desirable to deliver the folded product without trimming. Machines embodying the invention will, therefore, include a second delivery mechanism which does not embody trimming devices. In the construction illustrated, the guide 14 is formed as a switch and may be set so that the product coming from the rolls 13 instead of being delivered to the advancing devices before described, may be delivered directly to an S-fly 94 which in turn delivers the product to the conveyer 93.

Changes and variations may be made in the construction by which the invention is carried into effect. The invention is not, therefore, to be confined to the particular constructions herein shown and described.

What is claimed is:—

1. The combination with means for forwarding a folded product, of end trimming knives past which the product is carried by the forwarding means, means for holding the folded product and an edge trimming knife arranged to trim the product while so held.

2. The combination with means for forwarding a folded product, of end trimming knives past which the product is carried by the forwarding means, an edge trimming knife, and registering means for determining the position of the product with respect to the edge trimming knife.

3. The combination with means for supporting a folded product, of trimming means, and means for expelling the air from the product at or near the fold line prior to the operation of the trimming means.

4. The combination with means for supporting a folded product, of a presser for expelling the air from the product, means for causing the presser to come into operation first at or near the fold line of the product, and a trimming knife.

5. The combination with means for supporting a folded product, of a registering device, a presser for expelling the air from the product, means for causing the presser to come into operation first at or near the fold line of the product, and a trimming knife.

6. The combination with means for supporting a folded product, of means for expelling air therefrom, a trimming knife, and a clamp for operating on the edge of the product near the knife.

7. The combination with means for supporting a folded product, of registering means, a presser for expelling the air from the product, a trimming knife, and a clamp for operating on the edge of the product in proximity to the knife.

8. The combination with means for supporting a folded product, of a presser frame corresponding generally in outline to the product, means for operating the frame, said means causing the side of the frame which is near the fold line to come into operation first, clamping devices, and a trimming knife.

9. The combination with means for forwarding a folded product, of means for trimming the edge of the product opposite the fold line, and means for registering the product with respect to the edge trimming means.

10. The combination with means for forwarding a printed and folded product, of means arranged to act on the margin of said product to expel the air and flatten the product, and means for trimming the edge of the product opposite the fold line.

11. The combination with means for forwarding a folded product, of a knife for trimming the edge of the product opposite the fold line, means for registering the product with respect to said knife, a marginal air expelling and flattening frame, and means for operating the frame, said means bringing the side of the frame which operates along the folded edge of the product into operation first.

12. The combination with means for forwarding a folded product, of end trimming knives, a knife for trimming the edge of the product opposite the fold line, means for registering the product with respect to said knife, a marginal air expelling and flattening frame, and means for operating the frame, said means bringing the side of the frame which operates along the folded edge of the product into operation first.

13. The combination with means for forwarding a folded product, of a knife for trimming the edge of the product opposite the fold line, means for registering the product with respect to the knife, a cutter head in which the knife is mounted, and an air expelling frame carried by the cutter head.

14. The combination with means for forwarding a folded product, of a knife for trimming the edge of the product opposite the fold line, means for registering the product with respect to the knife, a cutter head in which the knife is mounted, an air expelling frame carried by the cutter head, and an edge clamp.

15. The combination with means for forwarding a folded product, of a knife cutting the edge of the product opposite the fold line, a cutter head in which the knife is mounted, an air expelling frame movably mounted on the cutter head and having the side edges farthest from the cutter head lying normally lower than the remainder of the frame, and an edge clamp.

16. The combination with means for supporting a folded product, of a knife for trimming the edge opposite the fold of the product, a movable registering stop, means for operating the knife, and means for advancing the product after trimming.

17. The combination with means for forwarding a folded product, of end trimming knives past which the product is advanced, an edge trimming knife, means for registering the product with respect to said knife, means for operating said knife, advancing devices, and means for operating said devices after the edge trimming knife has operated.

18. The combination with means for forwarding a folded product, of an end trimming device past which the product is carried by the forwarding means, an edge trimming knife, means for registering the product with respect to the knife, an air expelling device operating on the product prior to the edge trimming operation, and means for advancing the product after the edge has been trimmed.

In testimony whereof, I have hereunto set my hand, in the presence of two subscribing witnesses.

EDWARD P. SHELDON.

Witnesses:
F. W. H. CRANE,
LOUIS ROEHM.